April 6, 1954   C. H. LINDENBERG   2,674,058
FISH LURE
Filed Feb. 25, 1953
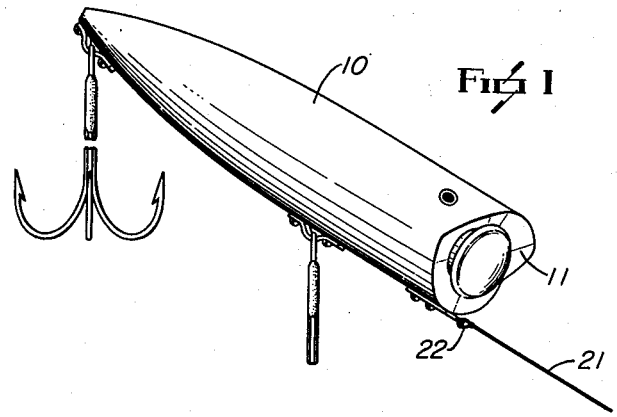
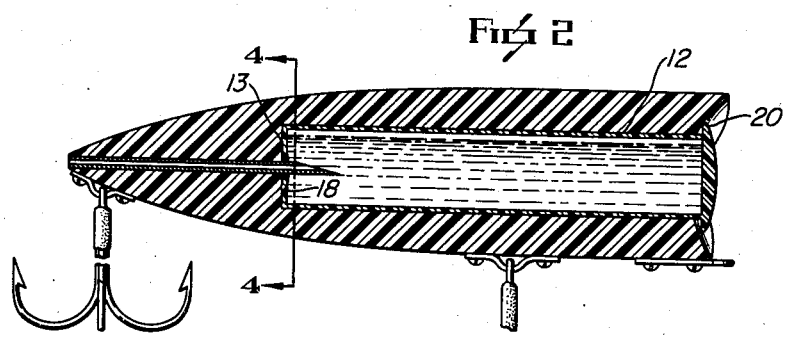
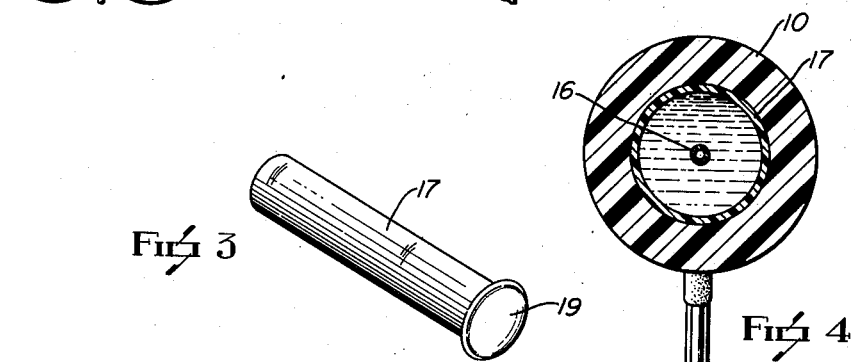
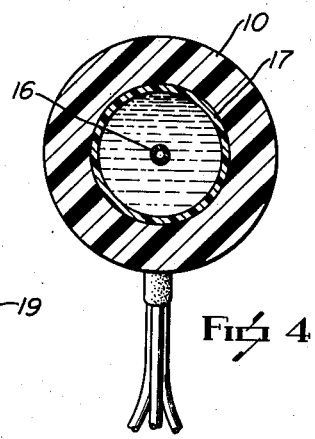
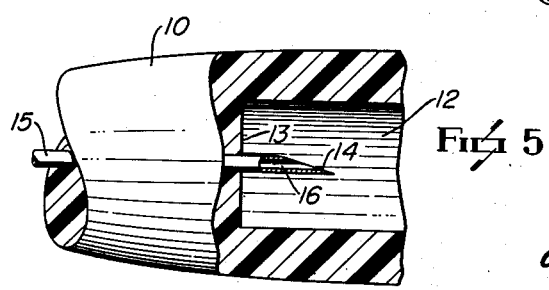
INVENTOR.
Charles H. Lindenberg
BY
ATTORNEYS.

Patented Apr. 6, 1954

2,674,058

UNITED STATES PATENT OFFICE 2,674,058

FISH LURE

Charles H. Lindenberg, Columbus, Ohio

Application February 25, 1953, Serial No. 338,683

9 Claims. (Cl. 43—42.06)

My invention relates to a fish lure. It has to do, more particularly, with a fish lure which is provided with means for effusing a liquid or other substance which resembles the natural secretions of a live fish and thereby makes the lure much more attractive to fish.

There have been attempts to provide artificial bait with arrangements for giving off scents or effusions attractive to fish. However, these artificial bait have been so constructed that it is necessary to inject a liquid into a porous body or chamber, or to place solid or powdered scent material in a compartment in the lure body, which is a disagreeable task and the scent material gets on the hands and often on the clothing of the fisherman using the lure.

It is the object of my invention not only to provide in a fish lure means for giving off effusions attractive to fish but to provide means for incorporating the desired effusing material into a fish lure body in a simple way whereby the fisherman can handle the material and apply it to the body easily and quickly and without getting the material on his hands and clothing.

According to my invention the material which is to serve as an attraction to the fish is packaged in the form of a capsule or cartridge. The lure is provided with a socket for receiving this cartridge and the socket is provided with means for puncturing the cartridge when the latter is positioned in the socket. Thereafter, the material will exude from the cartridge and the socket as the lure is pulled through the water.

The preferred embodiment of my invention is illustrated in the accompanying drawing wherein similar characters of reference designate corresponding parts and wherein:

Figure 1 is a perspective view of a lure with the cartridge in position therein.

Figure 2 is a longitudinal sectional view through the lure of Figure 1.

Figure 3 is a perspective view of the cartridge.

Figure 4 is a transverse section taken along line 4—4 of Figure 2.

Figure 5 is an enlarged detail, partly in side elevation and partly in longitudinal section, showing the means for puncturing the end of the cartridge.

With reference to the drawing, in Figure 1, I have shown a lure having a body 10 of any desirable form. The body 10 is preferably made of molded plastic. The front end 11 is blunt and preferably is slightly concave or funnel-shaped. The body 10 is provided with a cartridge-receiving socket 12 (Figure 2) which opens at the blunt forward end of the body. This socket 12 preferably extends almost the full length of the body, is of annular cross-section and has a flat inner end 13 (Figures 2 and 5). Projecting forwardly from the flat end 13 of the socket 12 and co-axially with the socket is the inner pointed end 14 of a tube 15 which is preferably of metal and may be molded in the plastic. This tube has a small passageway 16 extending therethrough. The tube 15 terminates at the rear extremity of the body 10.

The socket 12 is designed to receive the cylindrical cartridge or capsule 17 shown in Figure 3. This capsule may be made of a thin flexible plastic such as "Saran." It is provided with a flat inner end 18 (Figure 2) and a capped outer end 19, the cap extending beyond the body of the cartridge to provide a projecting peripheral flange 20. The cartridge 17 will fit tightly in the socket 12 and will be held therein mainly by friction. When pushed rearwardly into the socket 12, the flat end 18 thereof will be forced against the point 14 of the tube 15 which will puncture it as shown in Figure 2. The cartridge 17 can be removed readily when empty by inserting the fingernails under the flange 20 and pulling it out of the socket.

The cartridge will contain the desired lure or scent material, preferably in liquid form. It can be packaged conveniently in the form of the cartridge and can be inserted easily into the lure body with little effort and with no mess. The lure material may be fish oil, fish blood or anything attractive to fish. The cartridge will be such that the lure material will have no deleterious effect thereon. The lure material also will be such that it will not readily dissolve in water.

The lure body 10 can be pulled through the water by means of a line 21 connected to an eye member 22 attached to the lower side of the body at its front end. Pulling the lure through the water will cause the liquid to exude from the rear end of the body, the movement of the body through the water setting up a suction force at the rear end of the tube 15 which will aid in drawing out the liquid therefrom. The point 14 will puncture the rear wall 18 of the cartridge 17 in such a manner as not to plug the punctured opening. Water pressure on the capped forward end of the cartridge 17, during movement of the body 10 through the water, will aid in keeping the cartridge in the socket 12.

This will be aided by the concave or funnel-shape of the forward end 11 of the body.

Various other advantages will be apparent.

Having thus described my invention, what I claim is:

1. A fish lure comprising a body having a socket for receiving a cartridge containing a lure material, and means in the socket for piercing the cartridge when the latter is inserted therein.

2. A fish lure according to claim 1 wherein the socket has its forward end opening at the front end of the body and said cartridge piercing means comprises a pointed element projecting from the inner end of said socket.

3. A fish lure according to claim 2 wherein the pointed element is on the inner end of a tube which opens through said body.

4. A fish lure according to claim 3 wherein the forward end of the body is funnel-shaped.

5. In combination, a fish lure having a body with a socket formed therein, a cartridge complemental to said socket for insertion therein, said cartridge containing a lure material, and means projecting into said socket for piercing said cartridge when the latter is inserted therein.

6. The combination of claim 5 wherein the socket is of tubular form and opens at the front of the body, said socket having a flat inner end, said piercing means comprising a pointed element projecting forwardly from said flat inner end, and a passageway running from the flat rear end of the socket through the body to the exterior thereof.

7. The combination of claim 6 wherein the pointed element is on the inner end of a tube which extends through said body.

8. The combination of claim 7 wherein the forward end of the cartridge has a flange by means of which it may be pulled from the socket.

9. The combination of claim 8 wherein the forward end of the body is funnel-shaped.

References Cited in the file of this patent

UNITED STATES PATENTS

| Number | Name | Date |
|--------|------|------|
| 1,364,889 | Rupp | Jan. 11, 1921 |
| 2,091,457 | Sauer | Aug. 31, 1937 |
| 2,594,387 | Breuer | Apr. 29, 1952 |